(12) United States Patent
Richard

(10) Patent No.: US 8,498,897 B2
(45) Date of Patent: Jul. 30, 2013

(54) METHOD AND SYSTEM FOR PROVIDING REWARDS FOR RESPONSES TO BROADCAST PROGRAMMING

(75) Inventor: Postrel Richard, Miami Beach, FL (US)

(73) Assignee: Signature Systems LLC, Miami Beach, FL (US)

( * ) Notice: Subject to any disclaimer, the term of this patent is extended or adjusted under 35 U.S.C. 154(b) by 6 days.

(21) Appl. No.: 13/359,685

(22) Filed: Jan. 27, 2012

(65) Prior Publication Data

US 2012/0174146 A1 Jul. 5, 2012

Related U.S. Application Data

(63) Continuation-in-part of application No. 13/274,606, filed on Oct. 17, 2011, now abandoned, which is a continuation of application No. 11/755,340, filed on May 30, 2007, now abandoned, which is a continuation of application No. 11/539,250, filed on Oct. 6, 2006, now abandoned.

(51) Int. Cl.
*G06Q 30/00* (2012.01)

(52) U.S. Cl.
USPC ............... 705/14.28; 705/14.31; 705/14.33; 705/14.36

(58) Field of Classification Search
None
See application file for complete search history.

(56) References Cited

U.S. PATENT DOCUMENTS

| | | | |
|---|---|---|---|
| 6,253,203 B1 * | 6/2001 | O'Flaherty et al. ................... 1/1 |
| 6,766,524 B1 * | 7/2004 | Matheny et al. ................ 725/23 |
| 7,950,031 B2 | 5/2011 | Weinblatt et al. | |
| 7,992,161 B2 | 8/2011 | Meadows et al. | |
| 2003/0130895 A1 * | 7/2003 | Antonucci et al. .............. 705/14 |
| 2006/0287916 A1 * | 12/2006 | Starr et al. ...................... 705/14 |
| 2012/0084151 A1 * | 4/2012 | Kozak et al. ............... 705/14.58 |

FOREIGN PATENT DOCUMENTS

GB 2443870 A 5/2008
WO WO 2005048043 A2 * 5/2005

* cited by examiner

*Primary Examiner* — Thomas M Hammond, III
*Assistant Examiner* — Ed Baird
(74) *Attorney, Agent, or Firm* — Barkume & Associates, P.C.

(57) ABSTRACT

A broadcast signal having reward and broadcast (programming and/or advertising) content is broadcast, and viewers provide reward responses in response to queries in the broadcast content. Viewers also provide consumer data associated with the reward response provided. Rewards may then be awarded based on the accuracy of the reward response as well as the utilization of the associated consumer data provided.

78 Claims, 3 Drawing Sheets

US 8,498,897 B2

METHOD AND SYSTEM FOR PROVIDING REWARDS FOR RESPONSES TO BROADCAST PROGRAMMING

CROSS-REFERENCE TO RELATED APPLICATIONS

This application is a continuation-in-part application of Ser. No. 13/274,606 filed Oct. 17, 2011, which is a continuation application of Ser. No. 11/755,340 filed on May 30, 2007 now abandoned; which is a continuation application of Ser. No. 11/539,250 filed on Oct. 6, 2006 now abandoned.

TECHNICAL FIELD

This invention relates to loyalty or reward points programs, and in particular to a program that implements a reward program and card issued by a broadcast television network and allows affiliated sponsors and merchants to provide reward and incentive points to viewers of television programs on the network, thus managing viewer behavior and leveraging viewer loyalty.

BACKGROUND OF THE INVENTION

Broadcast television networks typically will insert commercials at strategic locations within as well as before and after television shows. Merchants that sponsor the ads continually look for new methods of attracting viewers to buy their products and services. It is extremely difficult for these sponsoring merchants to ascertain the effectiveness of their ads with respect to customer purchases. In other words, merchants cannot usually tell if a customer is making a purchase as a direct result of viewing an ad on television.

In addition, television program recording technologies have evolved to the point where many viewers will time-shift their viewing habits. That is, viewers will record a program and watch it at their leisure, employing controls over the program such as pause, rewind, and fast-forward. Although time shifting has been in practice since VCRs have become available to viewers, the practice has escalated in recent years due to the ease of digital recording and program control techniques popularized by the TIVO products and services. The result of the increased control that users have over their viewing is that many will skip over the commercials by fast forwarding. Some remote control devices has been made available with 30-second skip buttons that conveniently allow the viewer to press the button one or more times to easily skip the commercial. In addition, even if a viewer does not use time shifting techniques, there is no way of knowing if the viewer actually watches a commercial or leaves the viewing area to retrieve snacks or perform other tasks during the several minute commercial time span.

Thus, there is a desire in the art to provide a system that can give an incentive or reward for a viewer to watch a commercial (other than simply making the commercial artistically appealing). There is also a desire in the art to be able to measure the effectiveness of a commercial in terms of its ability to cause a viewer to make a purchase of a product or service of the sponsoring merchant.

In addition to providing an incentive for viewers to watch commercial advertisements, there is a desire by television stations and networks to increase viewership of its programs. That is, television networks continually look for ways to cause viewers to watch more programs on their networks (at the expense of watching shows on competing networks) and to be more loyal to the shows they watch (i.e. watch them regularly). Increased program viewership generally translates to increased commercial advertisement viewership, which will yield increased advertising revenue for the networks.

There is also a desire to provide a system and method for issuing an incentive to viewers, in the form for example of reward points, that may be maintained and tracked for each individual sponsor, yet may be part of a single overall program operated by the television broadcast network. By maintaining individual reward accounts for each sponsor (one of which may be the network itself), data may be generated as to the effectiveness of each sponsor's advertisements and the like, and a participating viewer may build value with a particular sponsor by earning reward points from that sponsor. In addition, by providing the implementation under the umbrella of a single program operated by a single broadcast television network, advantages are gained such as increased viewership to the network (since rewards are available only via that network), as well as aggregation and combination of reward points from the different sponsors' programs if desired by a viewer in order to gain more purchasing power.

In addition to providing rewards to viewers as an incentive to watch a commercial, it is desired to be able to be able to collect data from the viewers that may be related to the commercial and/or programming content, in order to better tailor the marketing and advertising activities of the sponsor. For example, a car manufacturer may desire to collect data from the viewers of the programs that it sponsors that will provide insight as to the cars the viewers currently drive, their income level, how they spend their disposable income, etc. Thus, the present invention also provides for rewards in exchange for submission of personal data from the viewers that may be associated with the advertising content being viewed.

Similarly, it is desired to be able to assign a value to a consumer/viewer that is relevant to the sponsor's promotions, and then to generate and award rewards that are related to the value of that consumer.

SUMMARY OF THE INVENTION

As described herein, the present invention is a system and method for enabling a content broadcast network such as a television or radio broadcast network to implement a network-wide reward program. In this program, reward content is provided to the viewer by one or more of various ways, including but not limited to separate rewards promotions or programs, in association with a sponsor's ads, or in association with a television program itself. For example, sponsors may provide ad content as well as reward content that is associated with television programming content and broadcast the content to viewers. The viewers see the reward content and, depending on the type of the content, may respond in one or more of various ways. If the reward response criteria of the reward content are satisfied, then the viewer will be provided with an appropriate reward, which may be in the form of reward points stored in a reward account associated with the sponsor and/or the network, a prize, etc. Rewards such as reward points may be earned and stored in an account and then redeemed at a later time, or combined with points from other sponsors associated with the reward program, etc.

For example, as described further herein, a sponsor may provide reward content in the form of a question regarding the subject matter of the ad or programming content—such as if an ad relates to a new car, the question may ask the viewer a question about the car, the answer to which could only be obtained by listening to and/or viewing the commercial attentively. The viewer could then be directed to call in to a toll-free number to provide the answer, to enter the answer at a special web site, to enter a button on the remote control of an interactive television set, and/or to visit the local showroom for that car and tell a salesperson the answer. If the answer provided is correct, then the viewer would receive the reward or prize, which may be in the form of reward points credited to his account, a free poster of the car, or even a discount off of the price of the car, etc.

A system as provided herein that provides rewards to viewers based on the requirement that they view certain programs and/or commercials provided by the television network, which provides many benefits to the sponsoring network, to the participating viewers, and to the participating sponsors as well as any merchants that sell the sponsors' products. This invention enables the network and its sponsors to attract eyeballs and implement viewer loyalty, which are extremely desired in the television and advertising industries. This invention transcends individual merchant reward programs since it provides a mechanism to drive traffic to merchants associated with the ad sponsors and provide rewards tied to the merchants/sponsors own accounts, well as aggregation of rewards with related merchants/sponsors (referred to herein as cluster marketing).

The present invention as described herein is a tool for providing rewards to viewers that is embedded throughout the programming schedule as desired by the system operator (i.e. the television network). The reward content interleaved with the commercials and program content may be targeted to and tailored for specific market segments, such as sports, news, soap operas, game shows, documentaries, talk shows, comedy shows, etc. These types of reward content will appeal to different market segments in the same manner as does different types of programming and advertising.

The reward content may be in any format that would elicit some type of response suitable for establishing that a viewer has watched and/or listened to an advertisement or a certain part of a television show. Thus, the reward content may include clues that are embedded within the ad or show, questions, answers to questions, trivia, code words or numbers, etc. The reward content may be a directive to watch a different show to obtain further information, or it may be in the form of a scavenger hunt. The reward content may be a directive to call an 800 toll free number within a certain time frame to obtain a prize or reward points on the viewer's account. Likewise, the viewer may be instructed to visit a certain web site on the Internet in the same manner.

The reward content may be generated and juxtaposed with ad content and/or programming content in a manner to effectively provide a network-wide sweepstakes or gaming environment.

As described below, when the reward consists of reward points, they may be associated with the sponsor, the network, an associated merchant of the sponsor, or any combination of the three. That is, a user may earn BMW reward points, or he may earn SMITHTOWN BMW reward points, or he may earn NBC reward points, or a combination of all three, by fulfilling the reward criteria as may be required.

Thus, the present invention will provide for customer acquisition and loyalty whereby the television network will be advantaged (since the loyalty program provides an incentive to view programs on that television network and not others), the product/service sponsors and merchants will be advantaged (since the viewer is watching the commercials to obtain reward content and related information), and the viewers will be advantaged (since they obtain rewards and prizes through the operation of the system).

This invention will enable the sponsors and network to leverage loyalty from one program to another program, via reward content associated with the program material itself or with commercial advertisements associated with the program material. This invention enables the system operator to monitor viewer behavior and then influence and modify it accordingly.

Additionally, this invention enables the viewers to provide consumer data such as personal information in response to a query that is received and displayed in association with the reward content and/or programming content and/or advertising content. The consumer data that is provided is associated in some manner with the reward/programming/advertising content. By collecting consumer information associated with the applicable content, sponsors can obtain valuable data regarding their products (i.e. if the consumer owns their products, how they use them, if they own competing products, etc.). This consumer information is valuable since it will, for example, help the sponsors market their products more effectively.

Thus, in one major aspect of the invention, the present invention is a method of and system for operating a reward program in association with a broadcast network. The system includes a broadcast server computer that generates a broadcast signal including reward content and broadcast content (such as programming content and/or advertising content). The broadcast server computer transmits the broadcast signal via a transmission network (such as cable, satellite, terrestrial, wireless, Internet, etc.). The broadcast signal may be a television broadcast signal, in which case the broadcast content is television broadcast content. Or, the broadcast signal may be a radio broadcast signal, in which case the broadcast content is radio broadcast content. Or, the broadcast signal may be an Internet broadcast signal, in which case the broadcast content is Internet broadcast content.

A receiving device at a viewer premises receives the broadcast signal. The receiving device is operative with the broadcast communications medium (such as a cable TV box, a standard TV, an interactive TV, a PC, a cell phone, a radio, a handheld computer, etc.). The receiving device outputs the broadcast content and the reward content from the received broadcast signal, and then the receiving device inputs from a viewer a reward response in association with the broadcast content and the reward content. The receiving device also inputs from the viewer consumer data associated with the reward response. The receiving device transmits the reward response and the consumer data to the broadcast server computer, which verifies the accuracy of the reward response (i.e. checks to ensure that the viewer has likely viewed the associated broadcast content). The broadcast server computer also utilizes the consumer data. The broadcast server computer then awards, in accordance with the accuracy of the reward response and the utilization of the consumer data, a reward to a reward account stored on behalf of the viewer. The reward may be for example reward points, or it may be monetary consideration, or a credit towards paying for a product or service provided to the viewer, or preferred event access rights.

The broadcast server computer may award a reward to a reward account stored at the broadcast server computer on behalf of the viewer, or it may award a reward to a reward account stored on a reward server computer on behalf of the viewer.

With respect to the utilization of the consumer data provided by the viewer, the viewer may additionally provide a data control parameter associated with the consumer data. The data control parameter specifies a level of control granted over utilization of the associated consumer data.

Thus, the level of control specified by the viewer will restrict the utilization of the consumer data.

Utilization of the consumer data, as may be restricted by the level of control specified by the viewer, may lead to generation of revenue. For example, consumer data that has been collected from multiple viewers may be aggregated and sold to a marketing firm (assuming the control level allows for this). In this case, the reward that is provided to the viewer may be based on the revenue that has been generated as a result of the usage of that consumer data.

In a similar manner, a value of the viewer may be assessed with respect to the broadcast content that is being viewed. For example, the personal data provided by the user may be used with a scoring algorithm to generate a value score for that viewer (e.g. if a user has a high income he will have a higher value score than if he has a lower income). That value score may then be used along with the broadcast content. For example, if the broadcast content is an advertisement for a luxury car, a viewer with a relatively high value score based on his income will be more relevant since luxury car providers require its purchasers to have higher incomes. In this case, the reward would be related to the value of the viewer with respect to the advertiser (i.e. a viewer with a higher relative score would receive a greater reward than a viewer with a lower relative score).

In one embodiment, the reward may include a current reward component and one or more future reward components. The current reward component is awarded in accordance with the current utilization of the consumer data, and the one or more future reward components are each awarded in accordance with a level of utilization of the consumer data at a corresponding future date.

In one embodiment, the broadcast signal has identical reward content broadcast to a plurality of viewers. Alternatively, the broadcast signal is personalized for each of a plurality of different viewers. In this case, the broadcast server computer generates personalized reward content for a viewer and transmits the personalized reward content only to the viewer for which the reward content has been personalized. For example, the personalized reward content may be transmitted only to the viewer for which the reward content has been personalized by transmitting the personalized reward content to an addressable set-top box associated with the viewer.

The reward content may be a visual or audible cue, it may have sweepstakes entry information, it may be query requiring an answer, etc. The reward content may be interleaved with the broadcast content such that it is viewed separately from the broadcast content. In the alternative, the reward content may be integrated with the broadcast content such that it is viewed at the same time as the broadcast content.

The viewer may provide the reward response and consumer data by various means such as but not limited to an interactive television set, a telephone, a personal computer, a handheld computing device, a smartphone, and/or a tablet.

In a second major aspect of the invention, the present invention is a method of and system for operating a reward program in association with a broadcast network. The system includes a broadcast server computer that generates a broadcast signal including personalized reward content and broadcast content (such as programming content and/or advertising content), wherein the personalized reward content is personalized for each of a plurality of different viewers. The broadcast server computer transmits the broadcast signal via a transmission network (such as cable, satellite, terrestrial, wireless, Internet, etc.) only to the viewer for which the personalized reward content has been personalized. For example, the personalized reward content may be transmitted only to the viewer for which the personalized reward content has been personalized by transmitting the personalized reward content to an addressable set-top box associated with the viewer. The broadcast signal may be a television broadcast signal, in which case the broadcast content is television broadcast content. Or, the broadcast signal may be a radio broadcast signal, in which case the broadcast content is radio broadcast content. Or, the broadcast signal may be an Internet broadcast signal, in which case the broadcast content is Internet broadcast content.

A receiving device at a viewer premises receives the personalized broadcast signal. The receiving device is operative with the broadcast communications medium (such as a cable TV box, a standard TV, an interactive TV, a PC, a cell phone, a radio, a handheld computer, etc.). The receiving device outputs the broadcast content and the personalized reward content from the received broadcast signal, and then the receiving device inputs from a viewer a reward response in association with the broadcast content and the personalized reward content. The receiving device transmits the reward response to the broadcast server computer, which verifies the accuracy of the reward response (i.e. checks to ensure that the viewer has likely viewed the associated broadcast content). The broadcast server computer then awards, in accordance with the accuracy of the reward response, a reward to a reward account stored on behalf of the viewer. The reward may be for example reward points, or it may be monetary consideration, or a credit towards paying for a product or service provided to the viewer, or preferred event access rights.

The broadcast server computer may award a reward to a reward account stored at the broadcast server computer on behalf of the viewer, or it may award a reward to a reward account stored on a reward server computer on behalf of the viewer.

In one embodiment, the reward may include a current reward component and one or more future reward components. The current reward component is awarded in accordance with the current utilization of the consumer data, and the one or more future reward components are each awarded in accordance with a level of utilization of the consumer data at a corresponding future date.

The reward content may be a visual or audible cue, it may have sweepstakes entry information, it may be query requiring an answer, etc. The reward content may be interleaved with the broadcast content such that it is viewed separately from the broadcast content. In the alternative, the reward content may be integrated with the broadcast content such that it is viewed at the same time as the broadcast content.

The viewer may provide the reward response and consumer data by various means such as but not limited to an interactive television set, a telephone, a personal computer, a handheld computing device, a smartphone, and/or a tablet.

DESCRIPTION OF THE PREFERRED EMBODIMENTS

Figure 1:
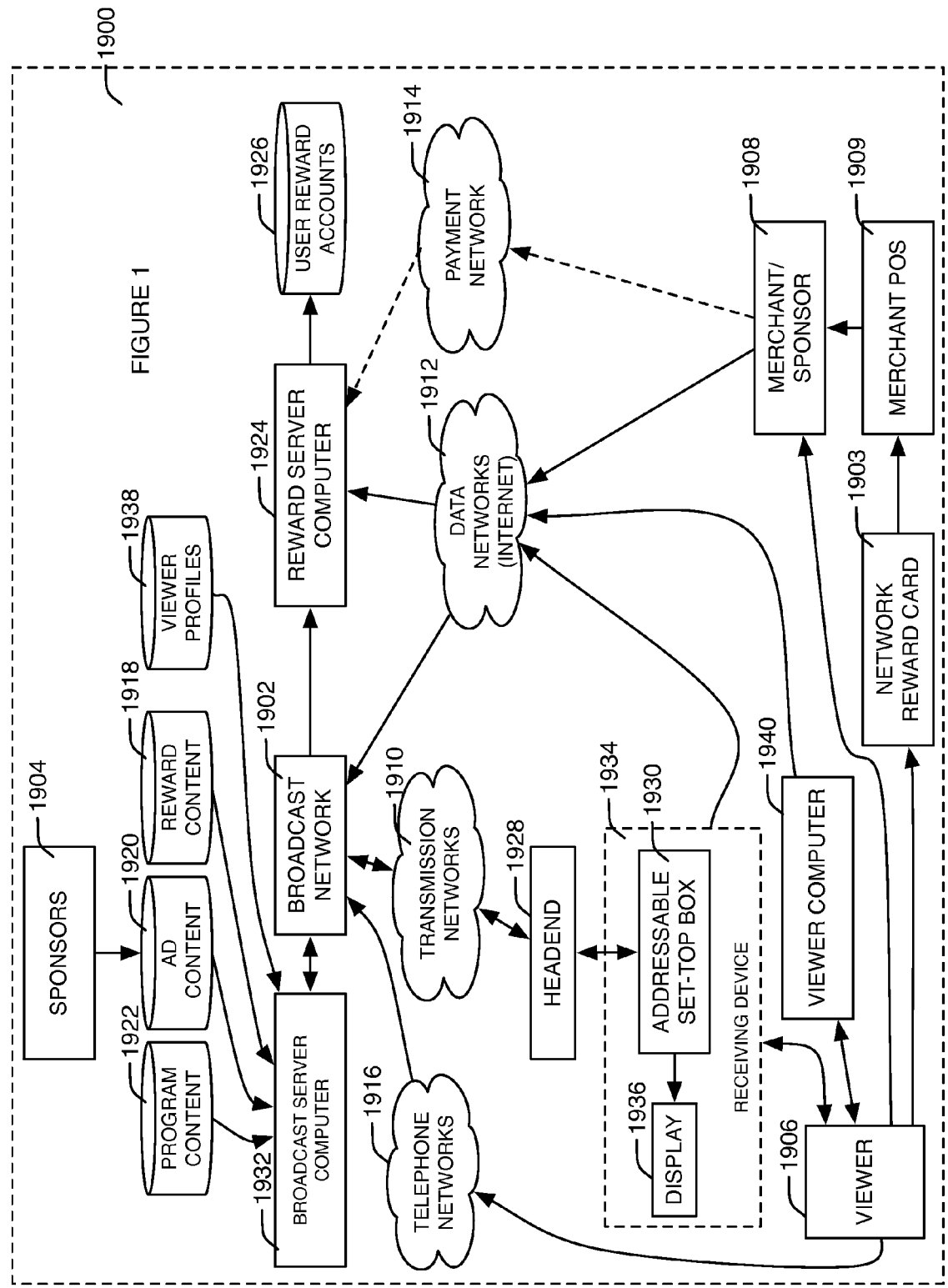
FIG. 1 illustrates a block diagram of the television broadcast network loyalty system of the present invention.

FIG. 1 illustrates a preferred embodiment of the present invention which operates in either of two major aspects as will be described below. The system 1900 includes several main subsystem components, which are a broadcast network such as a television network 1902, a group of participating sponsors 1904, a group of participating viewers (or listeners) 1906, and a group of participating merchant/sponsors 1908, all of whom communicate in various manners over one or more communications networks including transmission networks 1910, data networks 1912, payment networks 1914, and/or telephone networks 1916. The functionality and operation of each subsystem will now be described in detail.

The broadcast network 1902 represents in the preferred embodiment a television network, station(s), provider(s) or network of virtually any size, but will be referred to generally herein as a broadcast network. The function of the broadcast network 1902 is to provide broadcast signals such as television broadcast signals for transmission to the viewers 1906 in one or more of various known media, including but not limited to over-the-air (terrestrial) broadcasts, cable TV, satellite TV (e.g. DISH NETWORK or DIRECTV), streaming video over the Internet, and the like. The distribution of the television broadcast signals via these various media is well known in the art and need not be repeated herein. In addition, the operation of the present invention generally does not rely on the particular medium being employed to transmit the broadcast signals unless specifically mentioned herein. Thus, the broadcast network 1902 may include whatever computer hardware and software and other operational equipment such as signal transmitters as may be required to provide the broadcast signals to the viewers via the appropriate channels. Also shown in FIG. 1 is a headend unit 1928 and an addressable set-top box 1930 (which along with a display 1936 comprise a typical receiving device 1934). A typical cable TV network system will have numerous headend units 1928, each of which communicate with numerous addressable set-top boxes 1930 which are located at the premises of the viewer 1906. The operation of the cable TV network, headend units 1928, and set-top boxes 1930 are well known in the art and need not be described in full detail here except as to how these units are especially implemented in the present invention as further described below.

As indicated, the broadcast network in the preferred embodiment is a television broadcast network wherein the broadcast signal is a television broadcast signal. Alternatively, the broadcast network may be a radio broadcast network wherein the broadcast signal is a radio broadcast signal, or it may be an Internet broadcast network wherein the broadcast signal is an Internet broadcast signal.

The term broadcast signal (or broadcast content) encompasses programming content that are broadcast generally, such as prime time television shows, live sporting events, etc., as has been done in the television industry for decades. This term also encompasses the use of on-demand television signals available for example through digital cable television systems and satellite television systems, wherein a television show may be selected from a library of available programs (e.g. HBO ON DEMAND etc.). To the extent applicable in the present invention, reward content may also be provided in this type of programming scenario. Likewise, newer technologies that utilize data networks such as the Internet for providing programming content with a streaming or other type of distribution technology is also encompassed by the term television broadcast signal, assuming it carries the reward content as will be further described herein.

The viewers 1906 are equipped with one or more receiving devices 1934 as known in the art, which may includes an addressable set-top box 1930 and display 1936, which interoperate with the selected transmission network to receive the broadcast television signal. A typical example would be a standard cable box and television display unit that receives terrestrial signals via an antenna, or cable television signals via a coaxial cable as well known in the art. As explained above, the use of a set-top box 1930, also known as a cable TV decoder, is also encompassed by this system. Television receivers may be standard definition, enhanced definition, or high definition, as the case may be. Satellite receivers that interoperate with television monitors are also used with this invention. As described above, newer technologies that allow streaming of television programming on demand or otherwise will allow a viewer to use a viewer computer 1940 which may include a personal computer (or laptop computer, handheld computer-PDA, cell phone, etc.) to receive the applicable television signal. Thus, any type of receiving device/monitor that is interoperable with the television broadcast medium being employed is used with the present invention as described.

The present invention may operate in several different modes for providing reward content to viewers, based on the desires of the system participants—the broadcast network, the programmers, the sponsors, the merchants, the manufacturers, as well as the viewers themselves.

Reward content, which may be stored in a reward content database 1918, will be integrated with broadcast content which may include advertising (ad) content and/or programming content. Ad content is provided by a sponsor and stored in an ad content database 1920. Program content, which as describe above may include television shows, sporting events and the like, is stored in program content database 1922. The reward content, program content, and ad content are made available to a broadcast server computer 1932 of the television broadcast network 1902 in separate or integrated form. The reward content in this example is a text or graphical message that is displayed at the bottom of the screen for the duration of the ad as it is displayed to a viewer. For example, the text may provide a keyword, a code number or the like, with a directive to the viewer to make note of the information. The text will be associated in some manner with the sponsor, and may include a directive to visit the sponsor to obtain a reward. Thus, the ad may be sponsored by BMW for a BMW car, and the text may state: VISIT YOUR LOCAL BMW DEALER IN THE NEXT WEEK AND TELL THEM THE FOLLOWING NUMBER: 1738475. Similarly, the ad may be co-sponsored by a movie studio and BEST BUY stores for a new DVD movie release such as Star Wars VII, and the text may state: BRING YOUR STAR WARS LOYALTY CARD TO BEST BUY TODAY AND TELL THEM CHEWBACCA SENT YOU. In another example, the sponsor may be APPLE, and the ad may depict a new iPod device, and the text may state: LOG ONTO APPLE.COM AND ENTER THE COLOR OF THE IPOD IN THIS AD AND GET A FREE DOWNLOAD OF A NEW SONG. In another example, the sponsor may be Hertz Car Rentals, and the ad may be for a weekend rental rate, and the text may state: MAIL OR FAX YOUR BUSINESS CARD TO US TO GET A SPECIAL REWARD". Another example is useful in an interactive TV scenario, where viewers are able to use their remote controls to send data upstream (such as in the video-on-demand environment). In this case, the sponsor may be NBC networks, and the ad may relate to the upcoming Super Bowl telecast on NBC, where the text may state: PRESS 1 ON YOUR REMOTE CONTROL NOW TO OBTAIN A SPECIAL REWARD. In all of these examples, the reward content is integrated with the advertisement itself and provides visual (or audible) cues and instructions to undertake a certain act in order to obtain a reward. The acts requested may be different, however, such as where the act may be visiting a merchant associated with the sponsor (the BMW showroom) and providing information orally; it may be visiting a merchant that is a co-sponsor of the products being advertised (the DVD/Best Buy store) and providing a loyalty token for obtaining a reward; it may be logging onto a web site associated with the sponsor to obtain a reward (Apple); it may be sending (mail or fax) a physical item to evidence the reward (the Hertz/business card scenario); or it may be using an interactive TV remote to enter the required information upstream (the NBC scenario). Thus, as can be seen, there are many different modalities available for requiring a response from the viewer in order to obtain his or her reward.

The first scenario, where the text will be associated in some manner with the sponsor, and may include a directive to visit the sponsor to obtain a reward, will now be reviewed in further detail. As stated above, the ad may be sponsored by BMW for a BMW car, and the text may state: VISIT YOUR LOCAL BMW DEALER IN THE NEXT WEEK AND TELL THEM THE FOLLOWING NUMBER: 1738475. The viewer, upon seeing this on the screen, and assuming he or she is desirous of obtaining the reward, will visit the designated BMW dealer, and at some point tell a salesperson there the reward code 1738475. He may also be required to provide other information, such as name, address, email account, etc., which data is collected for subsequent marketing purposes. At this point, the salesperson will likely have to verify the accuracy of the reward response to confirm the reward, by reference to a designated information source, such as an internal memo or the like. The salesperson may also be required to interact in real time with the broadcast server computer 1932 in order to credit the reward to the viewer's reward account. In the alternative, the viewer may have a reward account 1926 stored on a reward server computer 1924, in which case the reward is credited to that account. The salesperson may do this by phone or through a web site operating in association with the broadcast server computer 1932 and/or the reward server computer 1924, where the salesperson would log in and enter the reward criteria (the code given and an identification of the viewer, which may be name or a unique ID number). Then assuming that there is a match between the code given and the reward criteria stored at the server 1924, then the reward will be approved. In one scenario, the reward is provided in real time, such as by giving the viewer a free gift (e.g. a BMW cap). In another scenario, the viewer is provided with reward points in an account. The account may be associated with the sponsor (BMW) and/or with the broadcast network (e.g. NBC). These reward points may be accumulated, aggregated, and redeemed, as further described. The use of a reward account may be more readily adapted to a scenario where repeated purchase may be made (such as the BEST BUY scenario described next), so in this case the simple real time reward of a gift may be more suitable.

Thus, the main components of the invention: providing reward content to the viewer, the viewer fulfilling the reward criteria by visiting the showroom and providing the reward code that was displayed on the screen, the merchant/sponsor confirming the reward with the reward server, and the viewer obtaining the reward as a result, are all exhibited in this scenario.

In the next scenario, the ad may be co-sponsored by a movie studio and Best Buy stores for a new DVD movie release such as Star Wars VII, and the text may state: BRING YOUR STAR WARS LOYALTY CARD TO BEST BUY TODAY AND TELL THEM CHEWBACCA SENT YOU. Thus, the viewer will see an ad for the new Star Wars movie on DVD, and the text will instruct him that he can purchase the DVD at Best Buy and give them the code phrase—Chewbacca sent him—to get his reward. When he visits Best Buy and purchases the DVD, he presents loyalty card 1903, which may be branded by the television network, by Best Buy, by the movie studio, or any combination of these entities. The viewer, at check out, swipes his loyalty card at the POS terminal, and inputs the code phrase (or tells it to the clerk who does the same). While the transaction is being approved, a reward request message is sent from the POS terminal over a data network (which may be the Internet, a dedicated network, or even the credit card network) to the broadcast server computer 1932 and/or the reward server computer 1924. There, the reward transaction data is verified, and if approved, the reward is given to the consumer. As with the BMW scenario above, the reward may be a prize given to the viewer at that time—such as a poster of the movie, etc. In the more likely case, the viewer will have reward points credited to his reward account associated with the loyalty card and stored at the reward server. Since the viewer is likely to make further purchases at Best Buy, the use of an a reward account with accumulating reward points is preferred. In the alternative, the reward may be provided to the viewer without requiring a purchase, i.e. simply by showing up at the store and presenting his card, and then giving the designated code (Chewbacca) to a clerk. As an additional alternative, a code word need not be supplied, and the reward may be provided accordingly.

In the third example, the sponsor may be Apple Computers, and the ad may depict a new iPod device, and the text may state: "LOG ONTO APPLE.COM AND ENTER THE COLOR OF THE IPOD IN THIS AD AND GET A FREE DOWNLOAD OF A NEW SONG. Thus, the viewer watches the iPod commercial on receiving device 1934 and is prompted to use his computer 1940 to log into the designated web site http://www.apple.com. After logging in to the web site, a link, text entry box or the like is provided where the viewer may enter the specified information (the color of the iPod in the commercial). This requires the viewer to pay attention to the substance of the commercial that is associated with the reward content. That is, if the viewer does not pay attention to the commercial, he will be unable to enter the correct color information (unless he guesses correctly). Upon entry of the correct iPod color, he may be prompted to enter his user information, which may be an account identifier and password, so he can download the free song as his reward. In the alternative, his reward points account may be credited with reward points in the same manner as descried above. This scenario therefore does not require the viewer to physically visit a store of the sponsor, since it allows online access to the reward site. In addition, this scenario differs from the first two above in that it requires the viewer to be attentive to the substance of the commercial itself, in addition to the reward content displayed on the screen.

In the fourth scenario provided above, the sponsor may be Hertz Car Rentals, and the ad may be for a weekend rental rate, and the text may state: MAIL OR FAX YOUR BUSINESS CARD TO US TO GET A SPECIAL REWARD. This does not require the viewer to physically visit a store location or use a computer, but only requires him to use mail or fax services to provide something to the reward service. In this case, he is asked to send in a business card, which will give the reward service vital information for subsequent marketing purposes. The viewer may obtain a reward as a result that may be in the form of reward points as described above, a credit for a weekend rental, etc.

In the fifth scenario described above, the viewer uses his remote control device in an interactive television embodiment to send data upstream. In this case, the sponsor may be NBC networks, and the ad may relate to the upcoming Super Bowl telecast on NBC, where the text may state: PRESS 1 ON YOUR REMOTE CONTROL NOW TO OBTAIN A SPECIAL REWARD. By selecting the designated control, data is provided upstream from the viewer that may be logged and cause the broadcast server computer 1932 and/or the reward server computer 1924 to increase the associated reward account of the viewer. In an alternative embodiment, a dedicated device may be provided to viewers that functions as a regular remote control for controlling the television, and also as a wireless communicator that is capable of sending data to a emote location. For example, a cellular device using an SMS (short message service) technology may be implemented to provide data transmissions to the central location that indicate input selections made by the viewer, thus enabling the awarding of reward points as described.

In a preferred embodiment, reward content may be displayed to a viewer in a pop-up or scrolling fashion. Thus, a viewer may be watching an advertisement or a program, and a pop up display will appear with information regarding the reward opportunity. By using the pop up (or scrolling) approach, the viewer's attention will be readily obtained, thus further increasing the value of the reward system.

As explained above, rewards such as reward points may be credited to a reward account stored at the broadcast server computer 1932, or alternatively in user reward accounts database 1926 associated with an external reward server computer 1924 as shown in FIG. 1. As indicated herein, reward points may be obtained in various ways based on the parameters of the reward program. A key criteria is to provide an incentive to the viewer for watching an advertisement (or a program) in order for them to obtain the reward points. The above examples provide several ways for a viewer to be able to obtain the desired reward points. Once a viewer has accumulated a predetermined number of reward points, he may redeem them for something of value as described further herein. For example the program may specify that a viewer may redeem 10,000 reward points for an entry into a sweepstakes, or the viewer may redeem 5,000 reward points for an item associated with a certain sponsor, etc.

As described, one key aspect of this invention is the ability to cross-pollinate viewing of various programs. Thus, an advertisement may be provided that urges the viewer to watch another television program. By viewing the second program, the viewer will have an opportunity to earn reward points in various ways. For example, the first advertisement (or program) may provide a first piece of information, and the second program to which the viewer is steered may have a second piece of information, whereby reward points may be obtained only if the viewer has both pieces of information. Thus, a baseball program viewed by a viewer may provide an advertisement (here, the sponsor is the network) that states TODAY'S CODE IS 1234; IF YOU WATCH the NFL GAME OF THE WEEK TONITE YOU CAN GET THE MISSING NUMBERS. On viewing the NFL Game of The Week, an advertisement is played that states TONITE'S CODE IS 5678; LOG INTO http://WWW.NETWORKREWARDS.COM NOW AND ENTER YOUR BASEBALL CODE WORD AND YOUR NFL CODEWORD AND RECEIVE 1,000 REWARD POINTS. Thus, the viewer that has watched both programs (the baseball game and the NFL game) can enter both code words into the web site and obtain 1,000 reward points (he would also have to enter his account number to obtain the reward points).

In the above example, a baseball show was utilized to drive viewership to a football program on the same network. It may also be desired to drive viewers to programs of a different type in order to attract new viewers to the different program. Thus, in the example above, the second show may be a news broadcast, or it may be an entertainment show, etc.

In addition to using sponsored advertisements as a vehicle for conveying reward information to viewers, the present invention implements an embodiment wherein reward information is conveyed in association with a television program itself in one or more of various manners as further described herein.

In one aspect, the reward content 1918 may be displayed along with program content 1922 while it is playing, much in the same manner as described above with ad content 1920 in the advertisement embodiments. That is, a text or graphic message may be superimposed on top of a program, such as a baseball game, inviting the viewer to perform a certain act such as log into a rewards web site or watch another program in order to obtain reward points. In another aspect, the reward content may be integrated into the television program itself. This may take many forms, such as a game show that invites audience participation wherein the winners may obtain reward points. For example, an entertainment trivia game show may be shown, wherein a celebrity host asks viewers as well as celebrity guests questions about a recent movie (this may be co-sponsored by the movie studio if desired) or about another television show on the same network. The viewer may log into a web site or call in with their answers, and if they are correct they will win reward points into their account. This game show concept may be expanded to become a rewards show, wherein various parameters are fulfilled that enable viewers to obtain rewards as described.

In the various scenarios described above, the broadcast signal may be sent to all viewers in a region such that all viewers will receive the same (identical) signal, and thus the same reward content along with the same program and ad content. These scenarios all function to provide rewards to a viewer based on the reward response that is provided, and usually the accuracy of the reward content is verified to ensure that the viewer has in fact been watching the associated programming content. In an alternative embodiment, reward content can be personalized to a particular viewer, and that personalized reward content can be sent to the desired viewer by use of the addressability of the set top boxes 1930. This is referred to as personalized addressable reward marketing. That is, the since each set top box 1930 can be addressed separately from the others (e.g. by use of a device address or the like), then reward content personalized for the specific viewer(s) associated with that set top box may be transmitted. As such, each individual viewer may receive reward content different from other viewers. When this occurs, the reward response that is expected from that viewer may be different from a reward response expected from another viewer. By using the addressable set top box, the broadcast network can also monitor if a particular viewer has or has not provided a reward response when requested. The lack of a response from a particular viewer (ascertained via the addressable set top boxes) may be used to ascertain if and how rewards may be awarded.

The reward content may be personalized by the broadcast server computer with reference to a viewer profile database 1938 as shown in FIG. 1. The viewer profiles are associated with the address of that viewer's set top box 1930 such that reward content that has been personalized will only be sent to the associated set top box 1930 (and thus viewed by the associated viewer 1906). For example, reward content may be generated for viewer John Smith, who has been registered in viewer profile database 1938 with an addressable set top box

1930 having a unique address. This personalized reward content may then state something such as "John Smith, you will receive 5,000 reward points for answering a question about the following commercial advertisement, which is double the normal amount since you answered a question correctly during yesterday's programs." Since the viewer profile indicates that viewer John Smith had answered a question during the prior program, this reward message may be especially adapted to viewer John Smith and sent only to his set top box 1930.

Although the preferred embodiment herein describes the use of an addressable set-top box, there is no requirement that this is the only type of device that may be implemented. Any similar device known in the art that is addressable to a particular viewer or household is contemplated by this embodiment of the invention. For example, a satellite converter may also be used, as well as a TIVO DVR unit, computer, smart television set, and the like.

In another aspect of the invention, the television network, associated sponsors, merchants, and manufacturers that participate in the rewards program are able to obtain valuable data from the program regarding the participating viewers. Data may be obtained from viewers in one or more of various modes. First, data may be obtained as a result of a registration process, wherein the viewer is required to provide certain data in order to participate in the reward program. This may be collected via a web site, call in, mail in, at a merchant location, etc.

In addition, data may be collected from viewers at any point in the participation process. For example, assume a viewer has logged in to the system in order to enter two code words, each of which has been supplied by to cross-linked programs as described above. At that point, the viewer may be asked to respond to a brief survey in order to obtain his reward points. The survey would likely be based on the programming he has just viewed, perhaps asking the viewer his rating of the show, suggestions for improvement, favorite characters, etc. This data is of course quite valuable to the television network as well as sponsoring companies.

Data may also be collected regarding the viewer's viewing habits as evidenced by the request to obtain reward points. That is, assume that a viewer logs in to the reward web site to obtain reward points from a certain show. These reward points may of course be traceable to that show since the data entered by the user to obtain the points would be linked to that show by the program operator. So, when the viewer enters code 12345, the system will understand that the viewer has just watched a certain new show, since that code word was provided during broadcast of that new show.

Data may also be collected regarding the user's shopping habits when he interacts with a sponsor or merchant in order to obtain and/or redeem reward points. This data along with the data described above, will prove quite valuable in assembling a viewer profile for subsequent marketing analysis, tracking, and related analytics.

As previously mentioned, and with respect to FIG. 1, reward points may be earned into one or more reward points accounts 1926 that are maintained on the broadcast server computer 1932 and/or in a reward server computer 1924 in association with the television broadcast network 1902 or a third party that operates the server on its behalf. For example, if the NBC television network operates the system of this invention, then viewer John Smith may have an account at NBC's broadcast server computer 1932 or an external reward server 1924 that will store the amount of reward points earned or otherwise accumulated by John Smith for activities that are related to programs and advertisements associated with NBC as described above. The viewer will be able to redeem those points as desired in a manner described below.

As shown in FIG. 1, data regarding the reward transactions, as well as any related transactions such as purchases, will be transferred to the broadcast server computer 1932 and/or reward server computer 1924 in one or more of various ways, depending on the nature of the transactions involved. One primary embodiment will use a data network 1912 such as the Internet for transferring reward transaction information. This will be applicable, for example, if a viewer 1906 is prompted to log into a web site operated by a rewarding entity in order to obtain reward points (or other prizes), such as if a reward promotion is displayed that prompts the viewer to log into http://www.espnnbc.com to enter the special code provided and receive 100 reward points. Likewise, the telephone network 1916 would be used if the viewer were required to call in such as by an 800 toll free number.

Similarly, a merchant/sponsor 1908 may utilize a data network 1912 in order to provide reward transaction data to the network broadcast server computer 1932 and/or reward server computer 1924. In this case, for example, the viewer visits a BEST BUY location and provides reward information (e.g. the secret code given in an advertisement), which may be during a purchase transaction for an associated product. The viewer may present a loyalty card (which may tied into a credit card, as described below) to a merchant POS device 1909, and the card will contain the viewer's identification information such as an account number. The required information will be sent via the data network 1912 to the broadcast server computer 1932 and/or reward server computer 1924 for processing. In the alternative, a pre-existing network infrastructure, such as a credit card network 1914, may be utilized instead of or as a supplement to the Internet 1912. This is particularly useful when the reward points are provided as part of a product or service purchase at a participating sponsor 1908, since the viewer will present his credit (or debit) card as part of the purchase transaction, and since transaction information will be processed by the credit card network 1914 regardless of the existence of a reward component. Thus, adapting the credit card network 1914 to perform functions of the reward component of this invention is advantageous.

In an alternative embodiment, radio services may be used separately or as an adjunct to the television broadcasts. In this mode, only audible prompts would be broadcast, with advertisements and/or regular programming as described above. For example, a sports show talk host could tell the listener to call in to an 800 toll free number to obtain 500 reward points in his listener account. Likewise, an advertisement for a BMW car could have a similar prompt during playback of the ad. These reward broadcasts could be done over terrestrial radio transmissions, satellite radio transmissions, streaming audio over the Internet, etc.

In addition, to using the radio broadcast as a stand-alone system, radio broadcasts could be used to supplement a television broadcast reward promotion. For example, a radio ad played during the day hours could provide half of a reward code as well as an instruction for the listener to tune in to a certain television show that evening and obtain the other half of the reward code in a manner similar to that described above. Thus, radio is used herein to provide an incentive to listen to another radio show or television show (and television could be used to provide an incentive to tune in to a radio show for similar rewards.

In addition or as alternative to using a single main reward account at broadcast server computer 1932 and/or reward server computer 1924 for storing all reward points earned through the broadcast network for all activities carried out with respect to its shows and advertisements, the system may be configured to provide multiple reward accounts, each of which would be associated with a separate television channel, or each of which could be associated with a separate television show, or a cluster of shows and/or channels, etc. Thus, for example, one permutation would provide a reward account for all rewards earned through viewing programs and advertisements shown on NBC. In another example, a reward account would be provided for all points earned through viewing all sports shows on the network regardless of the channel it may be shown on. In another example, a reward account may be provided for all points earned only for the show NBC EVENING NEWS. In another example, special promotions are established where reward points are stored in a separate account for all points earned through cross-linked program/advertisement promotions as described above. In addition to providing separate accounts, points may be earned into one account associated with the network but tagged in the database in order to distinguish the various features described above (single channel, single show, multiple shows, etc.) so that filters may be employed to determine how points have been allocated. Thus, virtually any configuration of managing and accounting for reward points may be adopted in this invention as desired.

In one aspect of the invention, viewers having multiple reward point accounts may redeem accumulated points from each account independently. That is, a viewer could redeem 1,000 NBC reward points for an NBC-sponsored prize such as a coffee mug. The viewer might redeem 5,000 reward points sponsored by APPLE, through its commercials, for a free song download over the Internet. The viewer might redeem 10,000 reward points from a series of BEST BUY commercials for a free DVD at a BEST BUY store or online, etc. In these examples, reward point accounts sponsored by a defined entity are redeemable with that entity (or with a third party associated with that entity).

In an alternative embodiment referred to as point aggregation, viewers are able to aggregate or pool reward points from two or more individual reward accounts in order to redeem them for an item, wherein they would have been unable to obtain that item with points from either account separately. For example, a viewer may have 2,000 NBC points and 3,000 EVENING NEWS points, neither of which might be enough for a prize of any merit. However, under this embodiment of the invention, the viewer could aggregate his points in one or more of various means, to yield 5,000 equivalent total points, which might then be redeemed for something of greater value. This methodology is described in detail in U.S. Pat. No. 6,594,640, SYSTEM AND METHOD FOR ELECTRONIC BARTER, TRADING AND REDEEMING POINTS ACCUMULATED IN FREQUENT USE REWARD PROGRAMS, which is owned by the assignee of this application and which is incorporated by reference herein. The '640 patent relates to systems and methods that allow for users to maintain individual reward point accounts with different rewarding entities, yet selectively exchange, combine or aggregate reward points as desired to provide increased value and purchasing power.

One way to provide for reward points aggregation would be to provide a separate exchange account, which could be managed for example by the broadcast network itself. In this case, for example, NBC would establish an exchange account for the viewer, and then reward point exchange transactions as requested by the viewer so that he could pool his rewards from other accounts (e.g. from his news account and from his sports account) accordingly. In another example, reward points could be traded from his sports account directly into his news account. In both examples, an exchange rate would be employed that would dictate the number of points the user would obtain in one account as a function of the number of points he must surrender in the other account. These aggregation and exchange techniques are fully described in the '640 patent described above.

In addition to providing a reward response as described above, the viewer may be requested to also provide consumer data that may be associated with the reward response. As described above, certain data may be provided by the consumer during various phases of the process. This includes providing name, address, and email account to a merchant such as in the first scenario above when the viewer visits the BMW dealer. Similarly, the viewer may provide information such as from a business card as described in the fourth scenario above. This information is also limited to general identification information such as name, address and telephone number from the business card. Also described above is the collection of consumer data during a program registration process whereby participation in the reward program requires providing the registration information such as name, address etc. This information ins useful since it will identify the consumer that is participating in the reward program so that merchants and sponsors may communicate with the consumers subsequent to the reward participation (e.g. a follow up letter, phone call. email etc.) This contact information may also be collated and sold to third party mailing list providers as known in the art.

Additionally, information may be collected from the viewers that is more than simple contact information; i.e. that is associated with the actual programming content, advertising content, and/or reward content or reward response being provided. For example, as explained above, a viewer may be asked to respond to a brief survey in order to obtain his reward points. The survey could be based on the programming he has just viewed, perhaps asking the viewer his rating of the show, suggestions for improvement, favorite characters, etc. Additionally, the viewer may be asked to provide consumer data that is associated with his reward response. As an example, a car manufacturer may desire to collect data from the viewers of the programs that it sponsors that will provide insight as to the cars the viewers currently drive, their income level, how they spend their disposable income, etc. As the viewer is entering a reward response to a query such as PLEASE ENTER THE COLOR OF THE CAR IN THIS COMMERCIAL, the viewer may also be asked to enter the make/model/year of their current car, whether they lease or own the car, their income level, etc. The rewards that are subsequently awarded to the viewer will be based on the amount of consumer data they provide in response to the request. Thus, the present invention also provides for rewards in exchange for submission of personal data from the viewers that may be associated with the advertising content being viewed.

Figure 2:
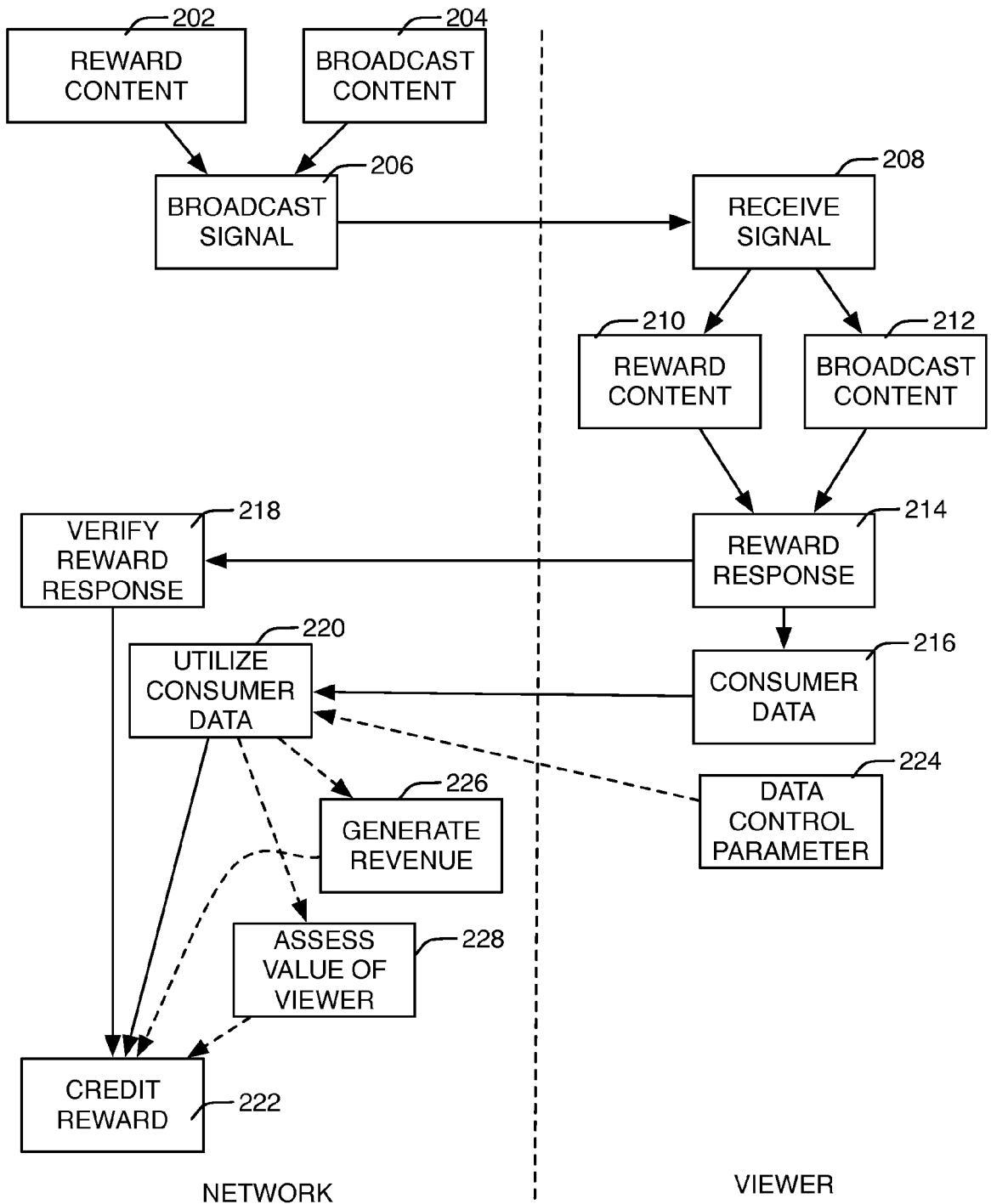
FIG. 2 is a flowchart of the operation of a first aspect of the invention.

Reference is now made to the flowchart of FIG. 2 for this particular embodiment. At step 202, reward content is generated (e.g. a request to enter the color of a car shown in a commercial). At step 204, broadcast content is generated (e.g. a commercial that shows a car such as a BMW commercial). At step 206, a broadcast signal is generated by the broadcast server computer 1932, that includes the reward content and the broadcast content. The broadcast signal is transmitted by the broadcast server computer 1932 via appropriate transmission equipment, and then received by a viewer's receiving device 1934 at step 208. At step 210 the reward content is viewed and at step 212 the broadcast content is viewed (such as with display 1936). At step 214, the viewer provides via the receiving device 1934 (and/or a computer 1940) a reward response in association with the broadcast content and the reward content. For example, the viewer may view a blue BMW in the broadcast content being displayed, and then enter the color blue as a reward response. The consumer also provides consumer data associated with the reward response at step 216 in response to a query. For example, the consumer may specify that he currently drives a red 1999 FORD IMPALA that he owns, and his wife drives a white 2010 BMW 325i that is leased. At step 218 the accuracy of the reward response is verified by the broadcast server computer 1932. For example, if the correct answer is a blue color car but the viewer entered a red color car then he would likely not receive the rewards since he provided an incorrect reward response. In step 220, the consumer data provided by the viewer is utilized by the broadcast server computer 1932. This may occur in various means, such as compiling a database of cars that are owned by viewers of the program, or generating a list of viewers that own cars more than 5 years old so that these viewers may be targeted for further promotions, etc. At step 222, the broadcast server computer 1932 will credit/award a reward to the reward account of the viewer in accordance with the accuracy of the reward response and the utilization of the consumer data provided by the viewer. The reward account may be stored at the broadcast server computer 1932 or the reward server computer 1924. For example, if the viewer provided an incorrect reward response he may get little or no reward, but if the correct reward response has been provided he would get a larger reward. Also, if the consumer data he has provided is utilized appropriately he may get a larger reward.

In a further embodiment, a data control parameter is provided at step 224 by the viewer to the broadcast server computer 1932. The data control parameter specifies a level of control granted over utilization of the associated consumer data. When this occurs, the broadcast server computer 1932 utilizes the consumer data in accordance with the level of control over utilization of the consumer data specified by the associated data control parameter. Accordingly, the reward that is provided to the consumer will be a function of the control parameter. For example, if the viewer specifies a high level of control and the consumer data provided is thereby less useful, then the reward that is credited may be relatively lower than if the viewer specifies a low level of control and the consumer data provided is thereby more useful. User-specified data control parameters are discussed in more detail in my co-pending application Ser. No. 13/276,688 entitled METHOD AND SYSTEM FOR PROVIDING CONSUMERS WITH CONTROL OVER USAGE OF THE CONSUMERS' DATA AND REWARDS ASSOCIATED THEREWITH, which is assigned to the assignee of the present application, the specification of which is incorporated by reference herein.

In another embodiment, revenue may be generated by the broadcast server computer 1932 at step 226 by the utilization of the consumer data that has been provided. For example, consumer data collected form multiple consumers may be aggregated and sold to third party marketers, and the revenue that is collected may be shared in some proportion amongst the participating consumers that provided the data. Similarly, a reward that is provided to a consumer may be based in whole or in part on the generated revenue.

In another embodiment, the reward may include a current reward component and one or more future reward components. The current reward component is awarded in accordance with the current utilization of the consumer data described above. Similarly, the one or more future reward components are each awarded in accordance with a level of utilization of the consumer data at a corresponding future date.

In another embodiment, as shown at step 228, a value of the viewer is assessed, and the reward that is credited is based at least partially on the assessed viewer value. The viewer value may be the value of the viewer to a participating merchant, the broadcast network, one or more sponsors, manufacturers, data distributors, and the like. The viewer value may be assessed in various ways. For example, a viewer may be assessed a higher value if it is determined that he has made many high-end purchases, and conversely the viewer may be assessed a lower value if it is determined that he has only made low-end purchases. Or, the value of a viewer may be relatively higher to certain sponsors or merchants, based on the consumer data that has been provided. As such, a higher value viewer may receive higher value rewards than would a lower value viewer. The value of the viewer may be viewed over the projected life of the viewer, taking into account future trends on income, spending, etc.

As explained above, the reward that is awarded to the viewer may take many forms, including but not limited to reward points, monetary consideration, as well as a credit towards paying for a product or service provided to the viewer. In addition, the reward may include preferred event access rights, such as a backstage pass to a concert, SuperBowl tickets, etc.

In addition, a timing element may be used to determine the reward that is awarded to the viewer. For example, if the viewer provides a response immediately after the reward query is transmitted, then he may receive a larger reward then if he waits awhile to provide the response. There may be a maximum time specified within which he may provide the response and obtain any reward. As such, the reward may be based on the immediacy of the response, the recency of the response, as well as the frequency of the response.

Figure 3:
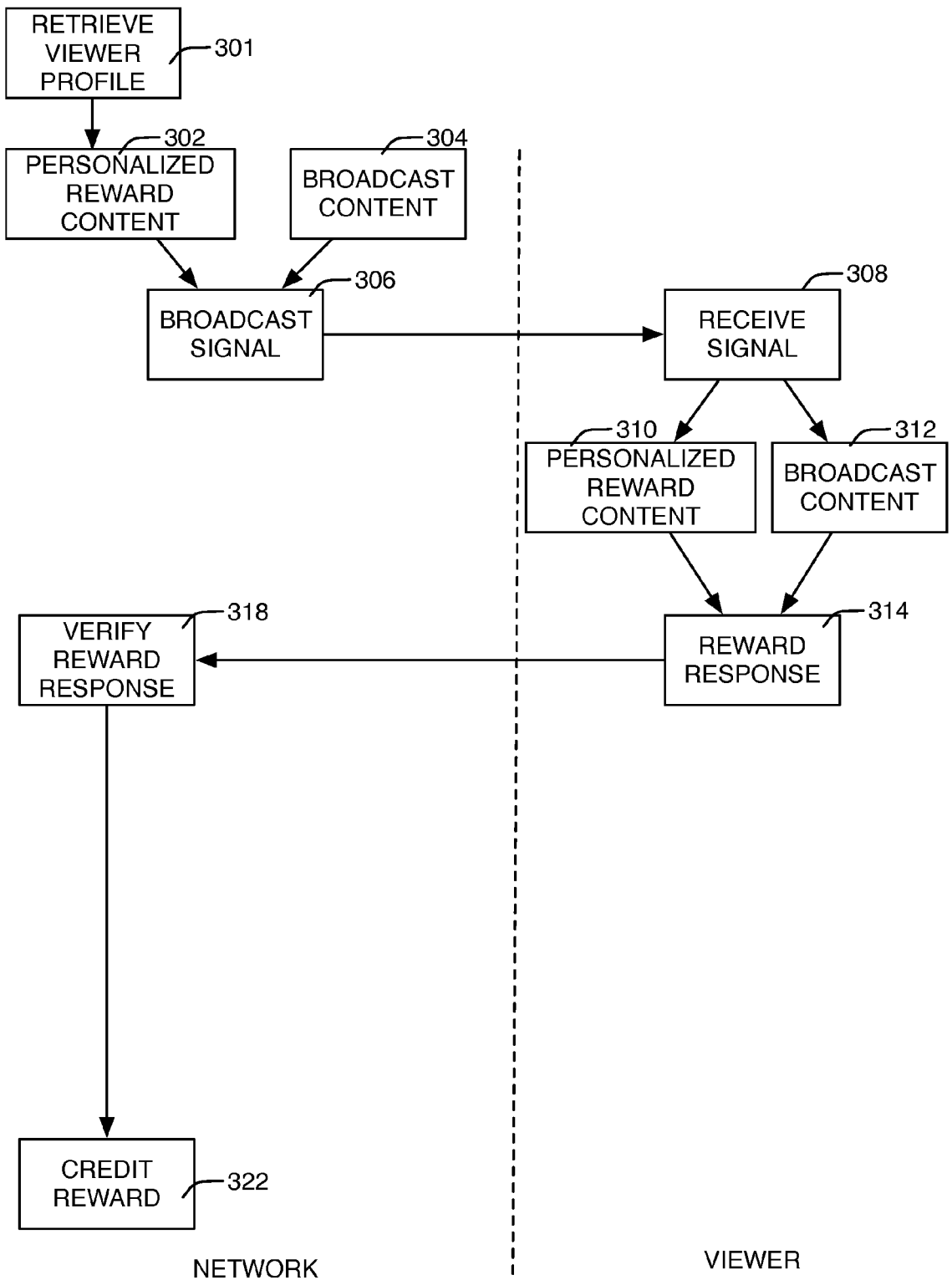
FIG. 3 is a flowchart of the operation of a second aspect of the invention.

Reference is made to the flowchart of FIG. 3 to explain another major aspect of the invention. At step 301, a viewer profile is retrieved for a certain viewer (or household). At step 302, personalized reward content is generated using the viewer profile from step 301. At step 304, broadcast content is generated. At step 306, a broadcast signal is generated by the broadcast server computer 1932, that includes the personalized reward content and the broadcast content. The broadcast signal is transmitted by the broadcast server computer 1932 via appropriate transmission equipment, and then received by a viewer's receiving device 1934 at step 308. At step 310 the personalized reward content is viewed and at step 312 the broadcast content is viewed (such as with display 1936). At step 314, the viewer provides via the receiving device 1934 (and/or a computer 1940) a reward response in association with the broadcast content and the personalized reward content. At step 318 the accuracy of the reward response is verified by the broadcast server computer 1932. At step 322, the broadcast server computer 1932 will credit/award a reward to the reward account of the viewer in accordance with the accuracy of the reward response and the utilization of the consumer data provided by the viewer. The reward account may be stored at the broadcast server computer 1932 or the reward server computer 1924. For example, if the viewer provided an incorrect reward response he may get little or no reward, but if the correct reward response has been provided he would get a larger reward. Also, if the consumer data he has provided is utilized appropriately he may get a larger reward. Examples of personalized reward content are provided above with respect to the first aspect of the invention.

Although particular embodiments of the present invention have been described above in detail, it will be understood that this description is merely for purposes of illustration. Alternative embodiments of those described hereinabove also are within the scope of the present invention. For example, the various functionalities undertaken by the broadcast server computer may be executed by one or more various other computers interoperating with the broadcast network and. or broadcast server computer. Furthermore, various embodiments described herein or portions thereof can be combined without departing from the present invention. The above described embodiments of the present invention are presented for purposes of illustration and not of limitation, and the present invention is limited only by the claims which follow.

What is claimed is:

1. A method of operating a reward program comprising the steps of:
   a. a broadcast server computer generating a broadcast signal comprising reward content and broadcast content,
   b. the broadcast server computer transmitting the broadcast signal via a transmission network;
   c. a receiving device at a viewer premises receiving the broadcast signal;
   d. the receiving device outputting the broadcast content and the reward content from the received broadcast signal;
   e. the receiving device receiving input from a viewer comprising a reward response in association with the broadcast content and the reward content;
   f. the receiving device receiving input from the viewer comprising consumer data associated with the reward response and a data control parameter associated with the consumer data, the data control parameter specifying a level of control granted over utilization of the associated consumer data;
   g. the receiving device transmitting the reward response and the consumer data to the broadcast server computer;
   h. the broadcast server computer verifying the accuracy of the reward response;
   i. the broadcast server computer utilizing the consumer data; and
   j. the broadcast server computer awarding, in accordance with the accuracy of the reward response and the utilization of the consumer data, a reward to a reward account stored on behalf of the viewer.

2. The method of claim 1 wherein the step of the broadcast server computer utilizing the consumer data comprises utilizing the consumer data in accordance with the level of control over utilization of the consumer data specified by the associated data control parameter.

3. The method of claim 1 further comprising the step of the broadcast server computer generating revenue by utilizing the consumer data, wherein the reward is based at least partially on the generated revenue.

4. The method of claim 1 further comprising the step of the broadcast server computer assessing a value of the viewer with respect to the broadcast content, wherein the reward is credited to the reward account in further accordance with the assessed value of the viewer.

5. The method of claim 1 wherein the reward comprises a current reward component and one or more future reward components,
   wherein the current reward component is awarded in accordance with the current utilization of the consumer data, and
   wherein the one or more future reward components are each awarded in accordance with a level of utilization of the consumer data at a corresponding future date.

6. The method of claim 1 wherein the broadcast signal comprises identical reward content broadcast to a plurality of viewers.

7. The method of claim 1 wherein the broadcast signal is personalized for each of a plurality of different viewers.

8. The method of claim 7 wherein the broadcast signal is personalized for a viewer by
   the broadcast server computer generating personalized reward content for a viewer, and
   the broadcast server computer transmitting the personalized reward content only to the viewer for which the reward content has been personalized.

9. The method of claim 8 wherein the personalized reward content is transmitted only to the viewer for which the reward content has been personalized by transmitting the personalized reward content to an addressable set-top box associated with the viewer.

10. The method of claim 1 wherein the reward comprises reward points.

11. The method of claim 1 wherein the reward comprises monetary consideration.

12. The method of claim 1 wherein the reward comprises a credit towards paying for a product or service provided to the viewer.

13. The method of claim 1 wherein the reward comprises preferred event access rights.

14. The method of claim 1 wherein the reward content comprises a visual cue displayed to the viewer via the receiving device.

15. The method of claim 1 wherein the reward content comprises an audible cue played to the viewer via the receiving device.

16. The method of claim 1 wherein the reward content comprises sweepstakes entry information.

17. The method of claim 1 wherein the broadcast content comprises programming content.

18. The method of claim 1 wherein the broadcast content comprises advertising content.

19. The method of claim 1 wherein the reward content is interleaved with the broadcast content, wherein the reward content is viewed separately from the broadcast content.

20. The method of claim 1 wherein the reward content is integrated with the broadcast content, wherein the reward content is viewed at the same time as the broadcast content.

21. The method of claim 1 wherein the broadcast signal is broadcast via a cable television distribution system.

22. The method of claim 1 wherein the broadcast signal is broadcast via a satellite distribution system.

23. The method of claim 1 wherein the broadcast signal is broadcast via a terrestrial distribution system.

24. The method of claim 1 wherein the broadcast signal is broadcast over a wide area.

25. The method of claim 1 wherein the broadcast signal is broadcast over a local area.

26. The method of claim 1 wherein the broadcast signal is broadcast via the Internet.

27. The method of claim 1 wherein the receiving device comprises a television set.

28. The method of claim 1 wherein the receiving device comprises a personal computer.

29. The method of claim 1 wherein the receiving device comprises a set top converter.

30. The method of claim 1 wherein the receiving device comprises a cell phone.

31. The method of claim 1 wherein the receiving device comprises a handheld computer.

32. The method of claim 1 wherein the viewer uses a telephone and enters information into the telephone enabling the reward to be credited to the viewer's reward account.

33. The method of claim 1 wherein the viewer enters the reward response and the consumer data via an interactive television set.

34. The method of claim 1 wherein the viewer enters the reward response and the consumer data via a personal computer.

35. The method of claim 1 wherein the viewer enters the reward response and the consumer data via a handheld computing device.

36. The method of claim 1 wherein the viewer enters the reward response and the consumer data via a smartphone.

37. The method of claim 1 wherein the viewer enters the reward response and the consumer data via a tablet.

38. The method of claim 1 wherein the broadcast signal is a television broadcast signal and the broadcast content is television broadcast content.

39. The method of claim 1 wherein the broadcast signal is a radio broadcast signal and the broadcast content is radio broadcast content.

40. The method of claim 1 wherein the broadcast signal is an Internet broadcast signal and the broadcast content is Internet broadcast content.

41. The method of claim 1 wherein the broadcast server computer awards a reward to a reward account stored at the broadcast server computer on behalf of the viewer.

42. The method of claim 1 wherein the broadcast server computer awards a reward to a reward account stored on a reward server computer on behalf of the viewer.

43. A system for operating a reward program comprising:
a. a broadcast server computer programmed to
    generate a broadcast signal comprising reward content and broadcast content, and
    transmit the broadcast signal via a transmission network;
b. a receiving device at a viewer premises programmed to
    receive the broadcast signal;
    output the broadcast content and the reward content from the received broadcast signal;
    receive input from a viewer comprising a reward response in association with the broadcast content and the reward content;
    receive input from a viewer comprising consumer data associated with the reward response and a data control parameter associated with the consumer data, the data control parameter specifying a level of control granted by the viewer over utilization of the associated consumer data; and
    transmit the reward response and the consumer data to the broadcast server computer;
wherein the broadcast server computer is further programmed to:
    verify the accuracy of the reward response;
    utilize the consumer data; and
    award, in accordance with the accuracy of the reward response and the utilization of the consumer data, a reward to a reward account stored on behalf of the viewer.

44. The system of claim 43 wherein the broadcast server computer is further programmed to utilize the consumer data in accordance with the level of control over utilization of the consumer data specified by the associated data control parameter.

45. The system of claim 43 wherein the broadcast server computer is further programmed to generate revenue by utilizing the consumer data, wherein the reward is based at least partially on the generated revenue.

46. The system of claim 43 wherein the broadcast server computer is further programmed to assess a value of the viewer with respect to the broadcast content, wherein the reward is credited to the reward account in further accordance with the assessed value of the viewer.

47. The system of claim 43 wherein the reward comprises a current reward component and one or more future reward components,
    wherein the current reward component is awarded in accordance with the current utilization of the consumer data, and
    wherein the one or more future reward components are each awarded in accordance with a level of utilization of the consumer data at a corresponding future date.

48. The system of claim 43 wherein the broadcast server computer is programmed to generate a broadcast signal that comprises identical reward content broadcast to a plurality of viewers.

49. The system of claim 43 wherein the broadcast server computer is programmed to generate a broadcast signal that is personalized for each of a plurality of different viewers.

50. The system of claim 49 wherein the broadcast server computer is programmed to generate a broadcast signal that is personalized for each of a plurality of different viewers by
    generating personalized reward content for a viewer, and
    transmitting the personalized reward content only to the viewer for which the reward content has been personalized.

51. The system of claim 50 wherein the broadcast server computer is programmed to transmit the personalized reward content only to the viewer for which the reward content has been personalized by transmitting the personalized reward content to an addressable set-top box associated with the viewer.

52. The system of claim 43 wherein the reward comprises reward points.

53. The system of claim 43 wherein the reward comprises monetary consideration.

54. The system of claim 43 wherein the reward comprises a credit towards paying for a product or service provided to the viewer.

55. The system of claim 43 wherein the reward comprises preferred event access rights.

56. The system of claim 43 wherein the reward content comprises a visual cue displayed to the viewer via the receiving device.

57. The system of claim 43 wherein the reward content comprises an audible cue played to the viewer via the receiving device.

58. The system of claim 43 wherein the reward content comprises sweepstakes entry information.

59. The system of claim 43 wherein the broadcast content comprises programming content.

60. The system of claim 43 wherein the broadcast content comprises advertising content.

61. The system of claim 43 wherein the broadcast server computer is programmed to generate a broadcast signal comprising reward content and broadcast content by interleaving the reward content with the broadcast content, wherein the reward content is viewed separately from the broadcast content.

62. The system of claim 43 wherein the broadcast server computer is programmed to generate a broadcast signal comprising reward content and broadcast content by integrating the reward content with the broadcast content, wherein the reward content is viewed at the same time as the broadcast content.

63. The system of claim 43 wherein the broadcast signal is broadcast via a cable television distribution system.

64. The system of claim 43 wherein the broadcast signal is broadcast via a satellite distribution system.

65. The system of claim 43 wherein the broadcast signal is broadcast via a terrestrial distribution system.

66. The system of claim 43 wherein the broadcast signal is broadcast over a wide area.

67. The system of claim 43 wherein the broadcast signal is broadcast over a local area.

68. The system of claim 43 wherein the broadcast signal is broadcast via the Internet.

69. The system of claim 43 wherein the receiving device comprises a television set.

70. The system of claim 43 wherein the receiving device comprises a personal computer.

71. The system of claim 43 wherein the receiving device comprises a set top box.

72. The system of claim 43 wherein the receiving device comprises a cell phone.

73. The system of claim 43 wherein the receiving device comprises a handheld computer.

74. The system of claim 43 wherein the broadcast signal is a television broadcast signal and the broadcast content is television broadcast content.

75. The system of claim 43 wherein the broadcast signal is a radio broadcast signal and the broadcast content is radio broadcast content.

76. The system of claim 43 wherein the broadcast signal is an Internet broadcast signal and the broadcast content is Internet broadcast content.

77. The system of claim 43 wherein the broadcast server computer is programmed to award a reward to a reward account stored at the broadcast server computer on behalf of the viewer.

78. The system of claim 43 further comprising a reward server computer, wherein the broadcast server computer awards a reward to a reward account stored on the reward server computer on behalf of the viewer.

* * * * *

UNITED STATES PATENT AND TRADEMARK OFFICE
CERTIFICATE OF CORRECTION

PATENT NO.       : 8,498,897 B2  
APPLICATION NO.  : 13/359685  
DATED            : July 30, 2013  
INVENTOR(S)      : Richard Postrel Page 1 of 1

It is certified that error appears in the above-identified patent and that said Letters Patent is hereby corrected as shown below:

Title page, item (12), "Richard" should be changed to --Postrel--.
Title page, item (75), "Postrel Richard" should be changed to --Richard Postrel--.

Signed and Sealed this
Eighth Day of October, 2013

Teresa Stanek Rea
*Deputy Director of the United States Patent and Trademark Office*